Figure 1:
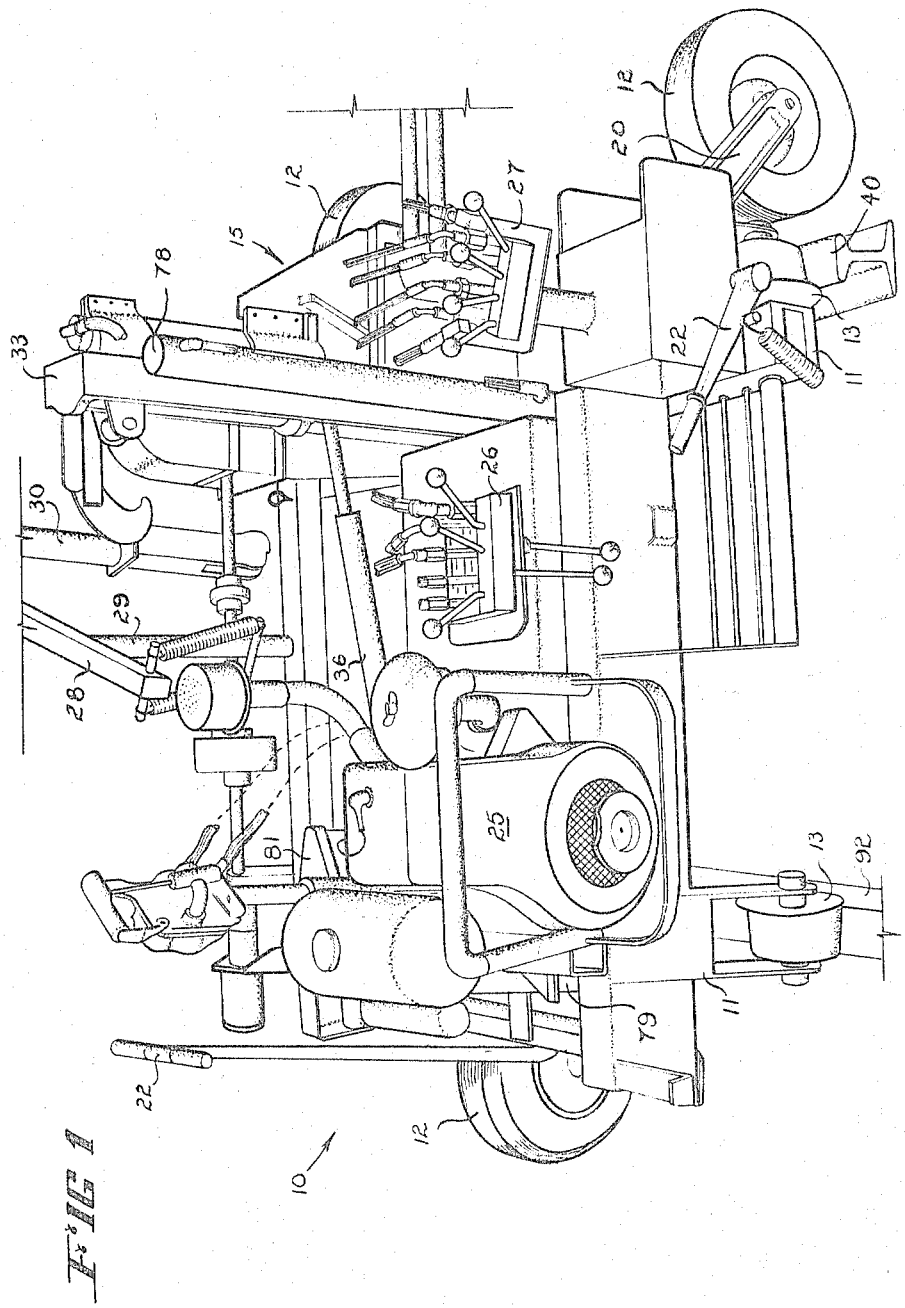

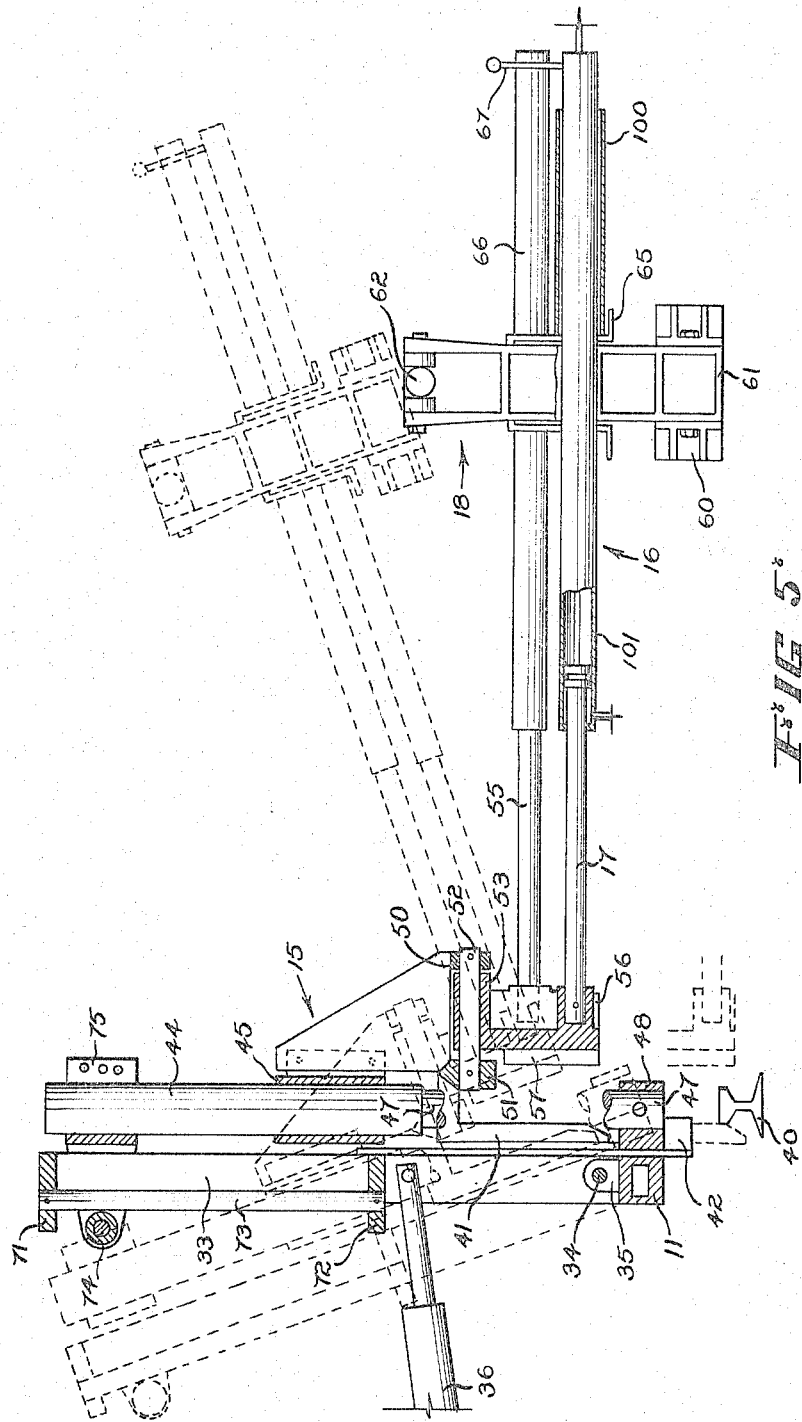

United States Patent Office 3,296,978
Patented Jan. 10, 1967

3,296,978
RAILROAD SLEEPER EXTRACTOR
William J. Yard, Cavan, South Australia, Australia, assignor to Australian Railway Equipment Supply Company Proprietary Limited, Adelaide, South Australia, Australia, and Trak-Chief Manufacturing Proprietary Ltd., Cavan, South Australia, Australia
Filed Sept. 2, 1964, Ser. No. 393,945
8 Claims. (Cl. 104—9)

This invention relates to a machine for the extracting of railroad sleepers from beneath rails when they are to be replaced.

According to previously proposed railroad sleeper extractors, a frame has been supported by rail engaging wheels and has been provided with a vertically fixed guide frame on one side, the guide frame having guides thereon which are engaged by complementary means on the clamp sub-frame which extends outwardly from the guide frame, the sub-frame having horizontal clamp guides which support a sleeper clamp for horizontal movement. The sleeper clamp of the previously proposed machines includes a pair of clamp jaws and a clamp cylinder and that is arranged to be moved in a horizontal direction by an extractor cylinder. The reaction is taken against the rail on the withdrawal side of the track.

One of the main objections to this machine has been that a moment of force is set up between the sleeper clamp jaws and the clamp guides by the extractor cylinder, since quite clearly it is not practicable for the extractor cylinder or clamp guides to lie in the same horizontal plane as the sleeper clamp where it engages the sleeper. Heretofore this moment has been resisted entirely by guides on the tilting guide frame, but since it is necessary for the tilting guide frame to slidably support the reaction jaws so that they can be lifted from or lowered to the rail, it is necessary to have slidable lifting means and this usually conveniently comprises a hydraulic cylinder. The moment is partly resisted by the guides and partly transmitted through the piston rod to the hydraulic cylinder, and a higher degree of maintenance has been encountered in these cylinders due to excessive piston pressures thus applied. Furthermore, excessive wear takes place due to lowering of the piston within the cylinder with the considerable overhung weight of the clamp sub-frame. The main object of this invention is therefore to provide means wherein the cylinder will be restrained against tilting due to moments which might exist during extraction, or due to overhung weight.

Not only does the moment have an adverse effect on the clamp lift cylinder but the entire machine tends under some conditions to become slightly unstable, and a further object of this invention is to provide means for more firmly securing the machine to the rails of a railroad track when a sleeper is to be withdrawn or replaced.

When a sleeper is to be withdrawn or replaced, the loading space on the rail which receives the reaction of the withdrawing force or replacing force can be sufficient in some cases to disturb the accurate gauge of the rails, and a further object of this invention is to provide means whereby some of the reaction is transmitted to the second rail.

The invention may therefore be said to consist of a railroad sleeper extractor which comprises a main frame, a guide frame extending upwardly from one side of the main frame, guide means extending along the guide frame, a clamp side frame extending upwardly from the guide frame, complementary guide engaging means on the sub-frame engaging the guide means on the guide frame and guiding the sub-frame in vertical movement relative to the guide frame, a reaction track on the guide frame disposed parallel to the guide means thereon, reaction track engaging means on the clamp sub-frame engaging the inner surface of the reaction track, said clamp sub-frame carrying a horizontal extractor cylinder and a sleeper clamp operatively connected thereto, whereby the moment applied by the clamp sub-frame in the direction of its overhung weight is partly resisted by the reaction track.

Figure 2:
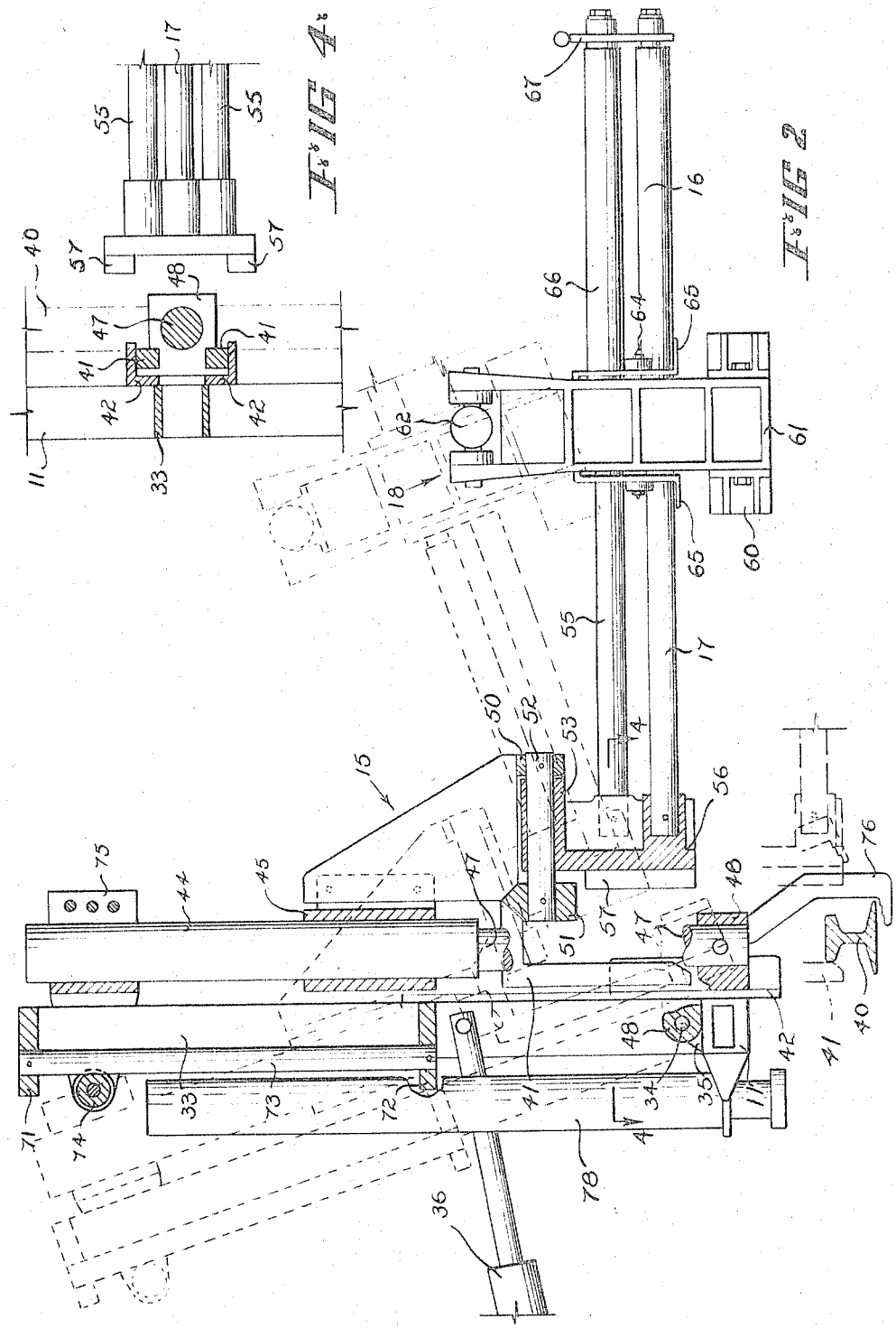
Figure 3:
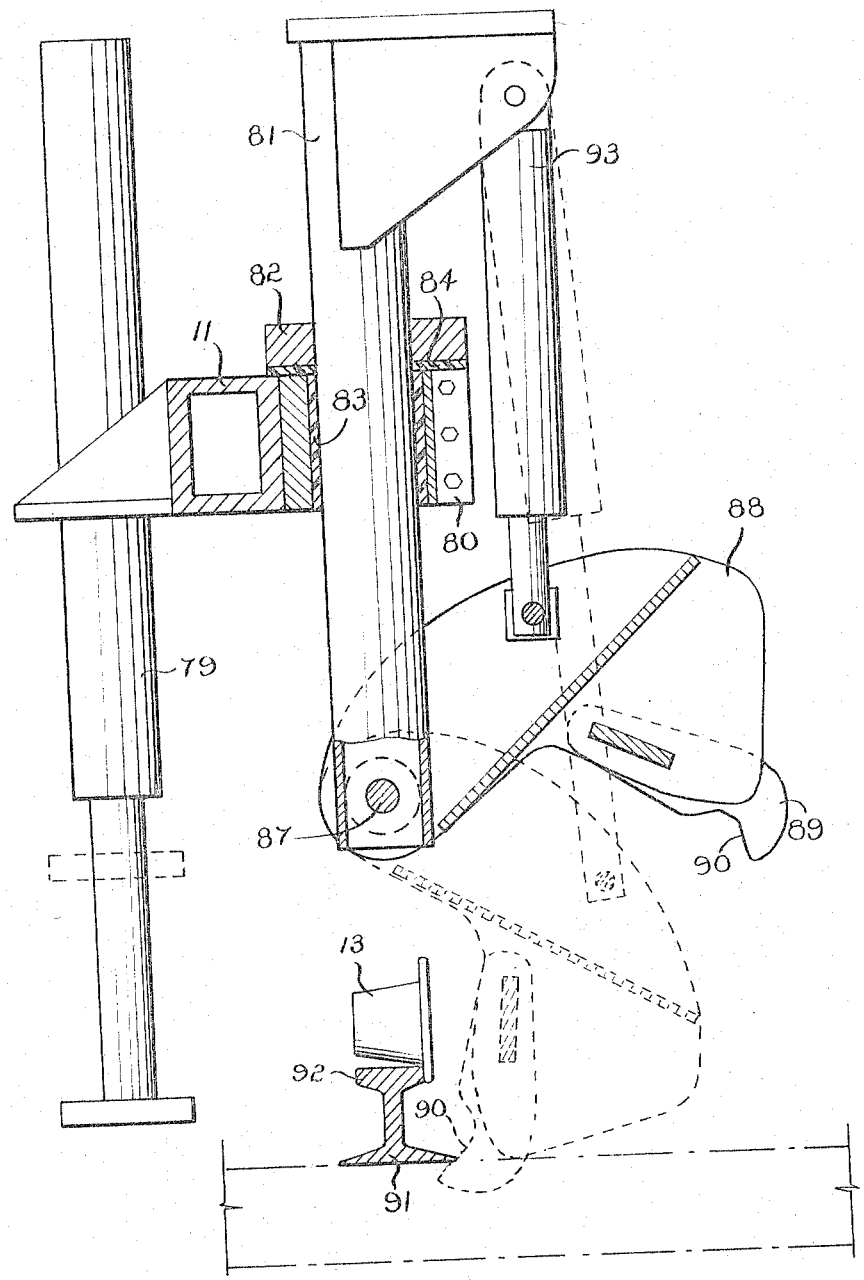

An embodiment of the invention is described hereunder in some detail with reference to and is illustrated in the accompanying drawings in which:

FIG. 1 is a perspective view of a sleeper extractor,

FIG. 2 is a fragmentary section through the guide frame and clamp sub-frame assembly showing the arrangement of the reaction track and the reaction track engaging means, FIG. 3 is a fragmentary section showing a clamp arrangement used on the side of the machine distal from the guide frame and clamp sub-frame assembly shown in FIG. 2, FIG. 4 is a section on line 4—4 of FIG. 2, and FIG. 5 is a section similar to FIG. 2 but showing a telescopic extractor cylinder.

Referring first to the general arrangement of FIG. 1, a railroad sleeper extractor 10 comprises a main frame 11 which is alternatively supported by three pneumatic tyred ground engaging wheels 12 or four rail engaging wheels 13. On one side of the extractor 10 is disposed a clamp sub-frame 15 which carries a slidable extractor cylinder 16 which is movable over a fixed piston rod 17 and horizontally moves a sleeper clamp 18 (FIG. 2).

The main frame 11 can be lifted by movement of the ground engaging wheels arm 20 under control of the lever 21, while the pull handle 22 can be used to move the machine on the wheels 12.

An engine 25 drives a hydraulic pump (not shown) which feeds a pair of control valves 26 and 27 to control the hydraulic cylinder on the machine. A spike pulley arm 28 is carried on a post 29 on the main frame 11 and its swinging end supports a depending spike pulling device 30.

FIG. 2 shows in some detail the extracting mechanism of the machine, and this includes a tilting guide frame 33 which is pivotal on a pin 34 carried between lugs 35 on a longitudinal member of the main frame 11. A clamp tilt cylinder 36 is operable to tilt the guide frame 33 to the position shown dotted in FIG. 2 and this greatly facilitates road transport.

The extraction side rail 40 is engageable on its inner surface by a pair of forked inner rail clamp jaws 41 which depend over and form part of the clamp sub-frame 15. These are guided at their lower ends by the jaw guides 42. The clamp sub-frame 15 is firmly clamped around the clamp lift cylinder 44 by the wrap-around clamp 45 the position of which on the cylinder 44 is adjustable. The cylinder 44 is vertically movable on its piston rod 47 which is pinned to an outstanding bracket 48 secured to the frame 11 between the two jaw guides 42.

The clamp sub-frame 15 also has a pair of spaced depending bosses 50 and 51 between which is disposed a horizontal bar 52, and this is slidably engaged by a circular slide 53 which is fixed relative to the piston rod 17 and a pair of parallel spaced clamp guides 55 disposed symmetrically one on each side of the piston rod 17 and slightly above it. The inner ends of the piston rod 17 and clamp guides 55 are pinned to a sliding clamp head 56 integral with the circular slide 53 and its sliding clamp head 56 has projecting on its inner end a pair of outer rail engaging jaws 57 which co-operate with the inner rail clamp jaws 41 upon extraction of a sleeper.

The sleeper clamp 18 consists of a pair of sleeper clamp jaws 60 which are on the lower ends of clamp levers 61 and are brought together or taken apart by operation of the sleeper clamp cylinder 62. The sleeper clamp jaws 61 pivot on axles 64 carried in brackets 65 which are fixed to the extractor cylinder 16. The brackets 65 also have fixed relative to them a pair of clamp slides 66 which slide over the parallel clamp guides 55 and so guide the sleeper clamp 18 during extraction of a sleeper. The outer ends of the piston rod 17 with clamp guides 55 are fixed in a cross head 67.

The tilting guide frame 33 has on it a pair of track support members 71 and 72 and these carry between them a reaction track 73. This is engaged by a reaction roller 74 on a saddle 75 clamped to the movable cylinder 44. Thus the amount of force due to the weight of the overhung clamp sub-frame 15 and the clamp 18 is carried partly by the track 73, and any moment of force due to sleeper extraction acting in the same direction is also carried to some extent by reaction on this track 73.

The operation of the sleeper extractor is readily seen from FIG. 2. The extractor cylinder is moved inwardly toward the extraction side rail 40, the sliding clamp head 56 is pulled outwardly on the horizontal bar 52, and the clamp lift cylinder 44 is lowered so that both the outer rail jaws 57 and the inner rail clamp jaws 41 move downwardly on each side of the extraction side rail 40 as shown dotted in FIG. 2. The sleeper clamp cylinder 62 is then operated by the control valve 27, and the extractor cylinder is moved downwardly over its piston rod, at the same time withdrawing the clamp 18 guided by its clamp slides 66 from the clamp guides 55. The initial movement will be taken up by sliding of the head 56 inwardly along the horizontal bar 52 until the extraction side rail 40 is firmly gripped, whereupon the sleeper will start its outward movement from beneath the rails. It will be seen that the moment imposed upon the clamp sub-frame will be partly resisted by the reaction roller 74 operating against the reaction track 73. The reaction roller 74 has a periphery with a circularly formed groove therein so that side force due to mis-alignment of the clamp guides with the sleeper will also be resisted partly by the reaction roller 74 acting on the reaction track 73.

Referring now to FIG. 3, the main frame 11 carries on it a lifting cylinder 79 which is hydraulically operated to lift the frame 11, and also a circular clamp 80 which supports a vertical column 81 the position of which can be adjusted within the circular clamp 80.

A collar 82 assists in retaining the height adjustment. An insulating sleeve 83 and washer 84 constitute insulating means between the column 81 and the frame 11 so that the machine does not provide a low resistance path between the rails and operation of the electrical control means of the rails is not commenced by use of this machine.

The lower end of the vertical column 81 carries on it a shaft 87 with a swinging arm 88, the swinging arm 88 carrying a pair of fingers 89 each of which constitutes a wedging member, being formed with a cam or wedging surface 90, and as shown dotted in FIG. 3, this wedging surface 90 engages below the flange 91 of the second rail 92. The swinging arm 88 is driven downwardly by the hydraulic cylinder 93. This arrangement constitutes clamp means for clamping the second rail 92 so that some of the reaction of the extractor cylinder 16 is transmitted to the second rail 92, and any tendency for the entire machine to rock over the first or extraction side rail 40 is prevented.

If desired, the wheel arm 20 can be moved under control of a hydraulic cylinder instead of the hand lever 21, the hydraulic cylinder for this purpose being conveniently parallel to the cylinder 93 in its control, this eliminating the need for further control valves.

In FIG. 5, the extractor cylinder 16 comprises an outer cylinder portion 100 which is slidable over an inner cylinder portion 101, which itself is slidable over the fixed piston rod 17. This constitutes a telescopic cylinder enabling a sleeper to be withdrawn in a single action.

What I claim is:

1. A railroad sleeper extractor comprising:
a main frame,
a guide frame extending upwardly from one side of the main frame,
guide means extending along the guide frame,
a clamp sub-frame extending outwardly from the guide frame,
complementary guide engaging means on the sub-frame engaging said guide means on the guide frame and guiding the sub-frame in vertical movement relative to the guide frame,
a reaction track on the guide frame disposed parallel to the guide means thereon, and
reaction track engaging means on the clamp sub-frame engaging the inner surface of the reaction track, said clamp sub-frame carrying a horizontal extractor cylinder and a sleeper clamp operatively connected thereto,
whereby the moment applied by the clamp sub-frame in the direction of its overhung weight is partly resisted by the reaction track.

2. A railroad sleeper extractor comprising:
a main frame,
a guide frame pivotally mounted on the main frame and extending upwardly from one side of the main frame,
an hydraulic guide frame tilt cylinder between the main frame and the guide frame positioning the guide frame either in a vertical operative position or alternatively in an inclined transport position,
guide means extending along the guide frame,
a clamp sub-frame extending outwardly from the guide frame,
complementary guide engaging means on the sub-frame engaging said guide means on the guide frame and guiding the sub-frame in vertical movement relative to the guide frame,
a reaction track on the guide frame disposed parallel to the guide means thereon, and
reaction track engaging means on the clamp sub-frame engaging the inner surface of the reaction track, said clamp sub-frame carrying a horizontal extractor cylinder and a sleeper clamp operatively connected thereto, whereby the moment applied by the clamp sub-frame in the direction of its overhung weight is partly resisted by the reaction track.

3. A railroad sleeper extractor comprising:
a main frame,
a guide frame extending upwardly from the extraction side of the main frame,
guide means extending along the guide frame,
a clamp sub-frame extending outwardly from the guide frame,
complementary guide engaging means on the sub-frame engaging said guide means on the guide frame and guiding the sub-frame in vertical movement relative to the guide frame,
a reaction track on the guide frame disposed parallel to the guide means thereon,
reaction track engaging means on the clamp sub-frame engaging the inner surface of the reaction track, said clamp sub-frame carrying extraction side rail engaging jaws, a horizontal extractor cylinder and a sleeper clamp operatively connected thereto, whereby the moment applied by the clamp sub-frame in the direction of its overhung weight is partly resisted by the reaction track, and
wedging members movable relative to the main frame and disposed at the side of the main frame distal from the clamp sub-frame, the wedging members being movable to a wedging position beneath the flange of a railroad rail thereby clamping the extractor thereto.

4. A railroad sleeper extractor comprising:
a main frame,
a guide frame pivotally mounted on the main frame and extending upwardly from the extraction side of the main frame,
an hydraulic guide frame tilt cylinder between the main frame and the guide frame positioning the guide frame either in a vertical operative position or alternatively in an inclined transport position,
guide means extending along the guide frame,
a clamp sub-frame extending outwardly from the guide frame,
complementary guide engaging means on the sub-frame engaging said guide means on the guide frame and guiding the sub-frame in vertical movement relative to the guide frame,
a reaction track on the guide frame disposed parallel to the guide means thereon,
reaction track engaging means on the clamp sub-frame engaging the inner surface of the reaction track, said clamp sub-frame carrying extraction side rail engaging jaws, a horizontal extractor cylinder and a sleeper clamp operatively connected thereto, whereby the moment applied by the clamp sub-frame in the direction of its overhung weight is partly resisted by the reaction track,
a swinging arm pivotal mounting fixed relative to the main frame at the side of the main frame distal from the clamp sub-frame,
a swinging arm carried by the pivotal mounting,
an hydraulic cylinder operatively connected between the main frame and swinging arm, and
wedging surfaces fixed relative to the swinging arm engageable beneath the flange of a railroad rail thereby clamping the extractor thereto at the side distal from the clamp sub-frame.

5. A railroad sleeper extractor comprising:
a main frame,
a guide frame mounted on the main frame at the extraction side thereof,
a reaction track extending along and fixed to the guide frame,
the piston rod of a clamp lift cylinder fixed at its lower end to the guide frame,
a saddle around the clamp lift cylinder near its upper end,
a reaction roller journalled to the saddle engaging the inner surface of the reaction track,
a clamp sub-frame clamped to the clamp lift cylinder and extending outwardly therefrom, the clamp sub-frame comprising a pair of spaced parallel clamp guides and a fixed extractor cylinder piston rod parallel to said guides extending horizontally when the guide frame is in its operative position, a telescopic extractor cylinder movable along the fixed piston rod, a sleeper clamp fixed to the extractor cylinder and movable along the guides, a pair of outer rail reaction jaws, and a pair of complementary inner rail clamp jaws, the outer rail reaction jaws and inner rail clamp jaws clamping the extraction side rail of a railroad upon inward movement of the extractor cylinder,
whereby the moment applied by the clamp sub-frame in the direction of its overhung weight is partly resisted by the reaction track.

6. A railroad sleeper extractor comprising:
a main frame,
a guide frame pivotally mounted on the main frame at the extraction side thereof and occupying alternatively a vertical operative position or an inclined transport position,
an hydraulic guide frame tilt cylinder between the main frame and the guide frame positioning the guide frame in either one of its said positions,
a reaction track extending along and fixed to the tilting guide frame,
the piston rod of a clamp lift cylinder fixed at its lower end to the guide frame,
a reaction roller journalled relative to the clamp lift cylinder engaging the inner surface of the reaction track, and
a clamp sub-frame fixed relative to the clamp lift cylinder and extending outwardly therefrom, the clamp sub-frame comprising clamp guides and an extractor cylinder parallel to said guides extending horizontally when the guide frame is in its operative position, a sleeper clamp operatively fixed to the extractor cylinder and movable along the guides, outer rail clamping means, and complementary inner rail clamping means, said clamping means clamping the extraction side rail of a railroad upon inward movement of the extractor cylinder,
whereby the moment applied by the clamp sub-frame in the direction of its overhung weight is partly resisted by the reaction track.

7. A railroad sleeper extractor comprising:
a main frame,
a guide frame mounted on the main frame at the extraction side thereof,
a reaction track extending along and fixed to the tilting guide frame,
the piston rod of a clamp lift cylinder fixed at its lower end to the guide frame,
a reaction roller journalled relative to the clamp lift cylinder engaging the inner surface of the reaction track,
a clamp sub-frame fixed relative to the clamp lift cylinder and extending outwardly therefrom, the clamp sub-frame comprising clamp guides and an extractor cylinder parallel to said guides extending horizontally when the guide frame is in its operative position, a sleeper clamp operatively fixed to the extractor cylinder and movable along the guides, outer rail clamping means, and complementary inner rail clamping means, said clamping means clamping the extraction side rail of a railroad upon inward movement of the extractor cylinder,
a vertical column fixed relative to but electrically insulated from the main frame and disposed above the second rail of the railroad,
a swinging arm hinged to the lower end of the vertical column,
an hydraulic cylinder between the column and swinging arm operable to move the swinging arm upwardly or downwardly,
a pair of fingers on the swinging arm, and
a wedging surface on each finger engageable beneath the flange of said second rail upon downward movement of said swinging arm thereby clamping the main frame to said second rail.

8. A railroad sleeper extractor comprising:
a main frame,
a guide frame pivotally mounted on the main frame at the extraction side thereof and occupying alternatively a vertical operative position or an inclined transport position,
an hydraulic guide frame tilt cylinder between the main frame and the guide frame positioning the guide frame in either one of its said positions,
a reaction track extending along and fixed to the tilting guide frame,
the piston rod of a clamp lift cylinder fixed at its lower end to the guide frame,
a saddle around the clamp lift cylinder near its upper end,
a reaction roller journalled to the saddle engaging the inner surface of the reaction track,
a clamp sub-frame clamped to the clamp lift cylinder and extending outwardly therefrom, the clamp sub-frame comprising a pair of spaced parallel clamp guides and a fixed extractor cylinder piston rod parallel to said guides extending horizontally when the guide frame is in its operative position, an extractor cylinder movable along the fixed piston rod, a sleeper clamp fixed to the extractor cylinder and movable along the guides, a pair of outer rail reaction jaws, and a pair of complementary inner rail clamp jaws, the outer rail reaction jaws and inner rail clamp jaws clamping the extraction side rail of a railroad upon inward movement of the extractor cylinder, a vertical column fixed relative to but electrically insulated from the main frame and disposed above the second rail of the railroad, a swinging arm hinged to the lower end of the vertical column, an hydraulic cylinder between the column and swinging arm operable to move the swinging arm upwardly or downwardly, a pair of fingers on the swinging arm, and a wedging surface on each finger engageable beneath the flange of said second rail upon downward movement of said swinging arm thereby clamping the main frame to said second rail.

No references cited.

ARTHUR L. LA POINT, *Primary Examiner.*

R. A. BERTSCH, *Assistant Examiner.*